3,694,274
HIGH-TRANSITION-TEMPERATURE SUPER-CONDUCTORS IN THE Nb-Al-Ge SYSTEM

Angelo L. Giorgi and Eugene G. Szklarz, Los Alamos, N. Mex., assignors to the United States of America as represented by the United States Atomic Energy Commission
Filed Apr. 26, 1971, Ser. No. 137,497
Int. Cl. C22c 27/00; H01v 11/12
U.S. Cl. 148—32  3 Claims

ABSTRACT OF THE DISCLOSURE

Superconducting materials of the nominal composition $Nb_xAl_yGe_{(1-y)}$, where $x$ is in the range of 1.9 to 2.8 and $y$ is in the range of 0.5 to 0.9, having transition temperatures in the 19°–20° K. range are readily produced by annealing arc-melted compositions, or cold-pressed, heat-treated compositions at moderate temperatures for reasonably long times (~50 hours).

CROSS REFERENCE TO RELATED APPLICATION

"Process for Preparing High-Transition-Temperature Superconductors in the Nb-Al-Ge System," by Angelo L. Giorgi and Eugene G. Szklarz filed concurrently with this application.

BACKGROUND OF THE INVENTION

The invention described herein was made in the course of, or under, a contract with the U.S. Atomic Energy Commission. It relates to high-transition-temperature superconducting materials, and more particularly to materials of this type that can be cold worked with a minimum of adverse effects on transition temperature.

In U.S. Pat. 3,506,940, issued Apr. 14, 1970, Corenzwit et al. disclose superconducting materials in the $Nb_3Al$-$Nb_3Ge$ system having transition temperatures of 19.5° K. and above. They also disclose a crtical annealing process by which the transition temperatures of various members of this system are increased to above 19.5° K. In so doing, they state that the primary purpose of their invention is to improve the transition temperature of any beta-tungsten phase material present. See column 4, lines 73–75 of said patent. This beta-tungsten phase is commonly associated with materials in the $Nb_3(Al,Ge)$ system.

According to Corenzwit et al., there is generally no objection to cold working materials in the $Nb_3(Al,Ge)$ system subsequent to annealing, although such working is frequently prevented by the brittle nature of the materials. The application for U.S. Patent 3,506,940 was filed May 2, 1967. It has since been found that cold working, as, e.g., grinding to fine powder, of annealed arc-melted materials in the $Nb_3(Al,Ge)$ system significantly degrades the transition temperatures of these materials. The degradation may be such that the new transition temperatures are well below those of the unannealed materials. In many potential applications of superconducting materials, cold working is desirable or even essential.

Arrhenius et al. in Proc. Nat'l. Acad. Sci. 61, 621–8 (1968) disclose transition temperatures above 20.5° K. for certain annealed, arc-melted compositions in the $Nb_3(Al,Ge)$ system. They indicate that the $Nb_3(Al,Ge)$ system is a multiphase system consisting of the phases: body-centered cubic niobium with primarily aluminum and smaller amounts of germanium in solid solution; a low-temperature segregate, thought to be beta-tungsten phase, from the niobium solid solution; beta-tungsten phase, consisting of $Nb_3(Al,Ge)$; and frequently a small amount of sigma phase consisting of $Nb_2(Al,Ge)$. The transition temperatures above 20.5° K. are attributed only to a stoichiometric and relatively well ordered beta-tungsten phase, because of the much lower transition temperatures of the Nb-rich solid solutions and the sigma phase (reported as less than 9.2° K. and about 12° K., respectively.

The annealed, arc-melted materials of the $Nb_3(Al,Ge)$ system are the only materials heretofore disclosed having transition temperatures in excess of 19° K. While Arrhenius et al. report an annealed material of the composition $Nb_{2.88}Al_{0.82}Ge_{0.18}$ having a transition temperature of 19.72° K. and Ruzicka in Z. Physik 237, 432–441 (1970) discloses an annealed material of the composition $Nb_{2.88}Al_{0.775}Ge_{0.225}$ having a transition temperature in excess of 19° K., it is apparent that these materials are considered as niobium deficient members of the $Nb_3(Al,Ge)$ system. Although a $Nb_2(Al,Ge)$ phase has been reported by Arrhenius et al., its composition has not been determined, and it has been considered merely as an undesirable impurity difficult to remove from a material consisting substantially of the beta-tungsten phase, i.e., $Nb_3(Al,Ge)$. There has been no indication in the literature that certain annealed materials in the $Nb_2(Al,Ge)$ system consisting substantially of tetragonal sigma phase ($D8_b$ type) have transition temperatures in excess of 19° K. Nor has it heretofore been revealed that a wide range of annealed materials having the nominal composition $Nb_x(Al,Ge)$, where $x$ ranges from 1.9 to 2.8, consisting substantially of varying mixtures of the sigma and beta-tungsten phases, also have transition temperatures in excess of 19° K.

It is known in the art that the binary niobium-aluminum system can form a superconducting tetragonal sigma-type structure having the nominal composition $Nb_2Al$. This material was first reported to have a broad superconducting transition from 7° to 12° K. and later found to remain superconducting up to 15.5° K.

SUMMARY OF THE INVENTION

Novel superconducting materials having the general composition $Nb_xAl_yGe_{(1-y)}$, where $x$ is in the range of 1.9 to 2.8 and $y$ is in the range of 0.5 to 0.9, are produced with transition temperatures ranging between 19° and 20° K. These materials, which are multiphase in nature and range from substantially the tetragonal sigma phase ($D8_b$ type) to substantially the beta-tungsten phase, can be readily prepared by arc melting the powdered elemental constituents under an inert atmosphere and annealing the resulting compounds for extended periods at temperatures of 700° to 800° C. A preferable mode of preparation, however, consists of premixing the powdered constituents, pressing them into a plug, heating the plug to 1450°–1800° C. for 30 minutes to an hour, and annealing.

The annealed sigma-phase $Nb_2(Al,Ge)$ compositions have a decided advantage over the arc-melted beta-tungsten phase $Nb_3(Al,Ge)$ compositions in that their transition temperatures are substantially unaffected by cold working such as grinding. In addition, their entire superconducting transition occurs over a comparatively narrow temperature span, e.g., 0.2° K. versus about 1.0° K. for the beta-tungsten-phase composition $Nb_3Al_{0.8}Ge_{0.2}$ which is reported to have a transition temperature of 20.05° K.

material having the molar ratio $Nb_{0.66}Al_{0.27}Ge_{0.07}$.

Figure 2:
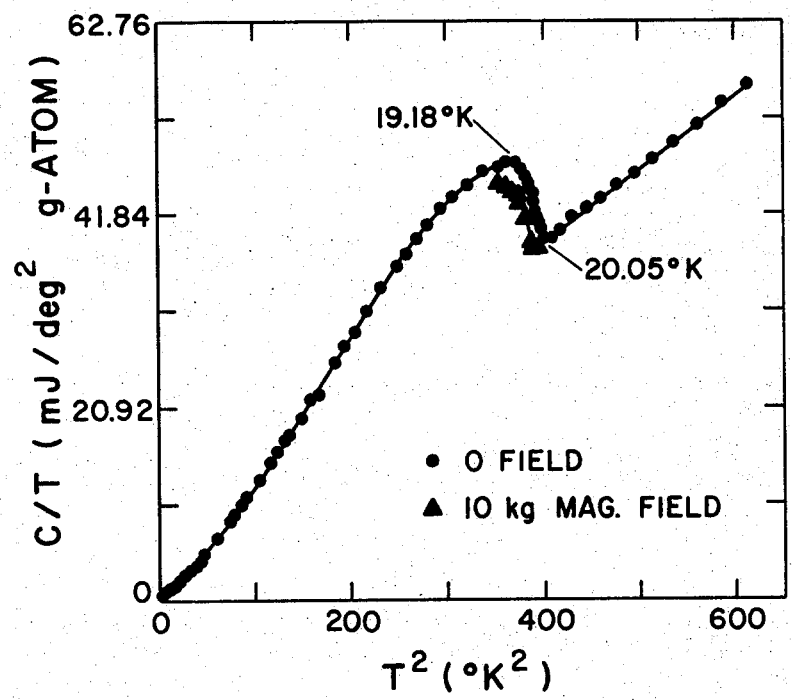

FIG. 2 is a curve of specific heat per degree versus the square of the temperature for an annealed $$Nb_3(Al,Ge)$$

material having the molar ratio $Nb_{0.75}Al_{0.20}Ge_{0.05}$.

Figure 3:
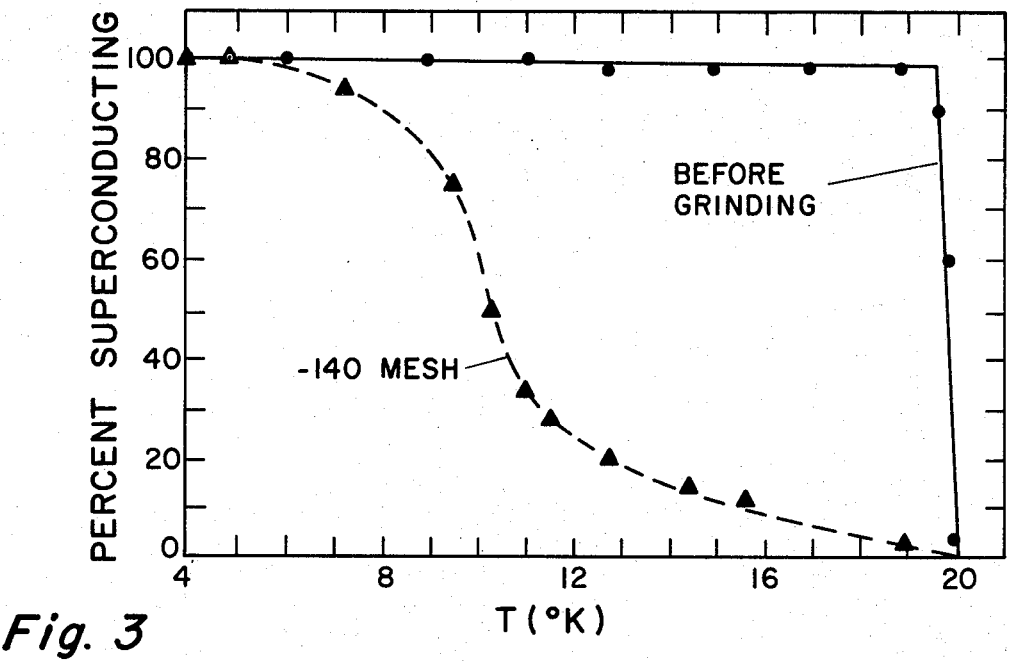

FIG. 3 shows the degradation in transition temperature for an annealed arc-melted sample ($Nb_3Al_{0.8}Ge_{0.2}$) consisting substantially of the beta-tungsten phase ground to a fine powder.

Figure 4:
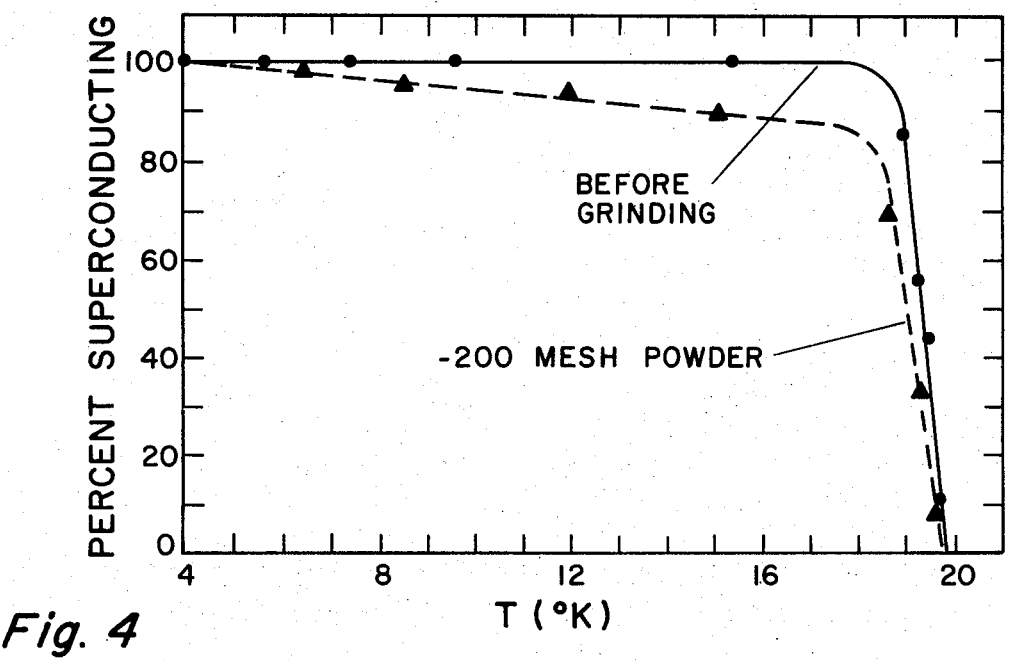

FIG. 4 shows the degradation in transition temperature for an annealed arc-melted sample ($Nb_2Al_{0.83}Ge_{0.17}$) consisting substantially of the sigma phase ground to a fine powder.

DETAILED DESCRIPTION

Figure 1:
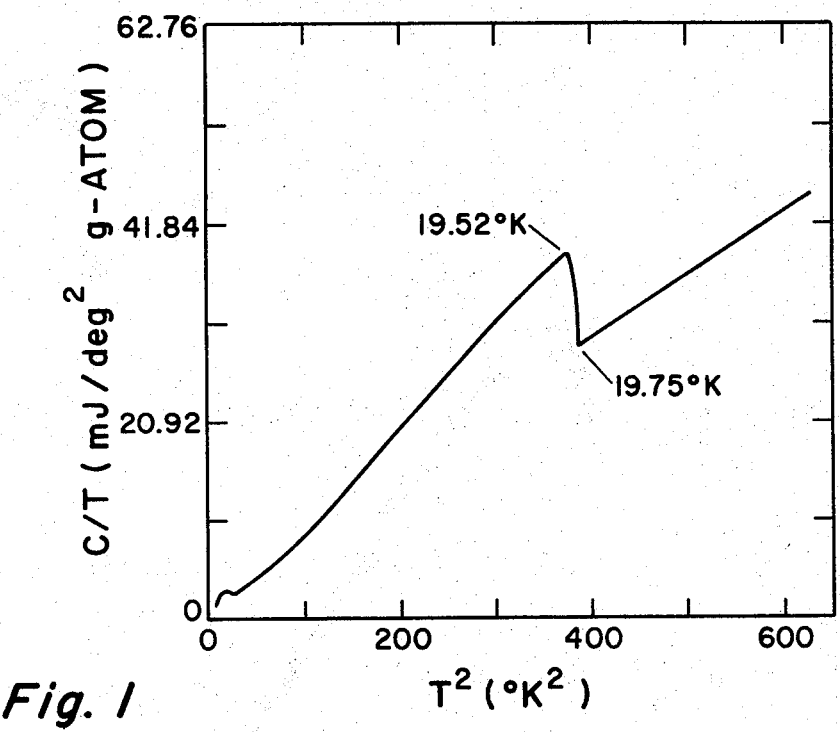
FIG. 1 is a curve of specific heat per degree versus the square of the temperature for an annealed $$Nb_2(Al,Ge)$$

The lattice parameters, transition temperatures, and heat treatments for various $Nb_2(Al,Ge)$ compositions are given in Table I. These compositions may readily be described by the general formula $Nb_2Al_yGe_{(1-y)}$. They consist substantially of sigma phase, but all contain varying amounts of a beta-tungsten phase as well as minute amounts of other phases as yet unidentified. To establish that the transition temperatures given for them are due to their entire bulk and not to the small amount of beta-tungsten phase present, a determination of the change in specific heat with temperature was made for an annealed material having the nominal composition $Nb_2Al_{0.8}Ge_{0.2}$ (Sample 8 of Table I). Ninety-five sets of specific heat-temperature data points for this material over a temperature range of 1.71° to 24.9° K. are plotted in FIG. 1. A similar plot for the beta-tungsten phase material of nominal composition $Nb_3Al_{0.8}Ge_{0.2}$ is given in FIG. 2. The data of FIG. 2 are taken from Matthias et al., Science 156, 645-6 (1967). As shown in FIG. 1, the entire superconudcting transition for the sigma-phase composition $Nb_2Al_{0.8}Ge_{0.2}$ as determined by the specific heat data occurs over a temperature span $\Delta T_c$, of only 0.2° K., whereas the beta-tungsten phase composition $Nb_3Al_{0.8}Ge_{0.2}$ has a $\Delta T_c$ of about 1.0° K. as shown on FIG. 2. Values for the electronic specific heat in the normal state ($\gamma$), the Debye temperature, ($\theta$), and the specific heat discontinuity at the superconducting transition temperature ($C_s-C_n$) are given in Table II for the sigma-phase composition $Nb_2Al_{0.8}Ge_{0.2}$ and the beta-tungsten-phase composition $Nb_3Al_{0.8}Ge_{0.2}$ and $Nb_3Al$.

The data for the sigma-phase composition were determined from the curve of FIG. 1 while those for the beta-tungsten-phase compositions were taken from published data in the literature. The low value for $\gamma$ for the sigma phase material relative to those for the beta-tungsten-phase materials is consistent with the literature wherein it is reported that gamma values for various sigma phase materials are all below 4.5 mj./deg.$^2$ g.-atom. It should be noted that the accuracy of the values of $\gamma$ and $\theta$ is uncertain due to the long extrapolation which must be made because of the high superconducting transition temperature but the absolute values clearly must lie within ±25% of the quoted values. The low value of gamma for the sigma phase relative to the values for the beta-tungsten phases is consistent with the findings of Heiniger et al., Phys. Kondens. Materie 5, 243 (1966) in their study of the low temperature specific heat of transition metals and alloys. The data of Table II support the results from X-ray diffraction studies which show that the $Nb_2Al_{0.8}Ge_{0.2}$ is predominantly sigma phase with only a small amount of the beta-tungsten phase present. The comparable values of the specific heat discontinuity confirm that the sigma phase is indeed the superconducting phase and therefore represents a new and novel high-temperature superconductor.

The high transition temperatures, i.e., those in excess of 19° K., are retained in somewhat niobium deficient members of the $Nb_2(Al,Ge)$ system. Thus, for example, an arc-melted material of the composition $$Nb_{1.9}Al_{0.83}Ge_{0.17}$$

has a transition temperature of 18.3° K. But an arc-melted material of the composition $Nb_{1.8}Al_{0.83}Ge_{0.17}$ has a transition temperature of only 17.5° K., indicative of a degradation in transition temperature at lower niobium contents.

A significant problem with the beta-tungsten-phase $Nb_3(Al,Ge)$ system is that cold working of the annealed arc-melted compositions strongly degrades their transition temperatures. An example of the effect of grinding an annealed arc-melted material of nominal composition $Nb_3Al_{0.8}Ge_{0.2}$ to −140 mesh powder is shown in FIG. 3. Before the grinding almost 100% of the mate- TABLE II.—$\gamma$, $\theta$, AND ($C_s-C_n$) VALUES FOR BETA-TUNGSTEN AND SIGMA PHASES

| Sample | $T_c$ (° K.) | $\Delta T_c$ (° K.) | $\gamma$ (mj./deg.$^2$, g-atom) | $\theta$ (° K.) | ($C_s-C_s$) (j./deg., g-atom) |
|---|---|---|---|---|---|
| $Nb_{0.75}Al_{0.25}$ ($Nb_3Al$) | 18.8 | 0.5 | ¹ 8.0 | 290 | 0.21 |
| $Nb_{0.75}Al_{0.20}Ge_{0.05}$ ($Nb_3Al_{0.8}Ge_{0.2}$) | 20.05 | 1.0 | ¹ 7.3 | 290 | 0.21 |
| $Nb_{0.66}Al_{0.27}Ge_{0.07}$ ($Nb_2Al_{0.8}Ge_{0.2}$) | 19.75 | 0.2 | ¹ 1.6 | 311 | 0.21 |

¹ Because of the long extrapolation required to obtain these values, they must be considered as approximations of the absolute values.

TABLE I.—LATTICE PARAMETERS AND TRANSITION TEMPERATURES OF VARIOUS $Nb_2Al_yGe_{(1-y)}$ SAMPLES

| Sample No. | Nominal composition | Lattice parameters of sigma phase $a_0$ | Lattice parameters of sigma phase $c_0$ | Transition temperature, $T_c$ (° K.) | Heat treatment |
|---|---|---|---|---|---|
| 1 | $Nb_2Al$ | 9.927±1 | 5.172±1 | 16 | Arc-melted. |
| 2 | $Nb_2Al$ | | | 17 | 120 hrs., 750° C. |
| 3 | $Nb_2Al_{0.9}Ge_{0.1}$ | 9.931±1 | 5.170±1 | 18.0 | Arc-melted. |
| 4 | $Nb_2Al_{0.9}Ge_{0.1}$ | | | 19.3 | 120 hrs., 750° C. |
| 5 | $Nb_2Al_{0.83}Ge_{0.17}$ | | | 18.4 | Arc-melted. |
| 6 | $Nb_2Al_{0.83}Ge_{0.17}$ | 9.931±1 | 5.169±1 | 19.8 | 114 hrs., 740° C. |
| 7 | $Nb_2Al_{0.8}Ge_{0.2}$ | 9.927±2 | 5.174±3 | 18.5 | Arc-melted. |
| 8 | $Nb_2Al_{0.8}Ge_{0.2}$ | 9.928±2 | 5.170±1 | 19.75 | 111 hrs., 750° C. |
| 9 | $Nb_2Al_{0.7}Ge_{0.3}$ | 9.926±2 | 5.171±1 | 18.6 | Arc-melted. |
| 10 | $Nb_2Al_{0.7}Ge_{0.3}$ | | | 19.7 | 120 hrs., 750° C. |
| 11 | $Nb_2Al_{0.6}Ge_{0.4}$ | 9.929±2 | 5.174±2 | 18.5 | Arc-melted. |
| 12 | $Nb_2Al_{0.6}Ge_{0.4}$ | | | 19.7 | 100 hrs., 750° C. |
| 13 | $Nb_2Al_{0.5}Ge_{0.5}$ | 9.927±2 | 5.173±3 | 18.5 | Arc-melted. |
| 14 | $Nb_2Al_{0.5}Ge_{0.5}$ | | | 19.0 | 100 hrs., 750° C. |
| 15 | $Nb_2Al_{0.4}Ge_{0.6}$ | (¹) | (¹) | 18.1 | Arc-melted. |
| 16 | $Nb_2Al_{0.4}Ge_{0.6}$ | (¹) | (¹) | 18.6 | 100 hrs., 750° C. |
| 17 | $Nb_2Al_{0.2}Ge_{0.8}$ | (¹) | (¹) | 9.2 | Arc-melted. |
| 18 | $Nb_2Al_{0.2}Ge_{0.8}$ | (¹) | (¹) | 9.1 | 100 hrs., 750° C. |
| 19 | $Nb_2Ge$ | | | 6.2 | Arc-melted. |
| 20 | $Nb_2Ge$ | | | 6.3 | 120 hrs., 750° C. |

¹ Diffraction pattern too diffuse for lattice parameter determination.

rial becomes superconducing at a transition temperature of 19.5° K. After grinding to —140 mesh only about 50% of the material is superconducting at a temperature of 10.3° K. By comparison, as illustrated in FIG. 4 grinding to —200 mesh produces only a slight degradation in the transition temperature of an annealed arc-melted material of nominal composition $Nb_2Al_{0.83}Ge_{0.17}$ (Sample 6 of Table I). This represents a very important difference in the properties of these two materials.

Materials in the $Nb_2(Al,Ge)$ system consisting substantially of the sigma phase are readily produced by arc melting desired proportions of powdered elemental constituents according to techniques well known in the art. Representative compositions prepared by arc-melting and their transition temperatures before and after annealing are given in Table I. It is singularly difficult, however, to prepare a single phase material by arc melting, which occurs at temperatures in excess of 2000° C. The sigma phase forms peritectically between 1800° and 1900° C., and the rapid cooling inherent in an arc-melt preparation is believed to be responsible for the multiphase character of the resulting material.

A preferred method of preparing materials having the nominal composition $Nb_xAl_yGe_{(1-y)}$ and ranging from substantially the sigma phase to substantially the beta-tungsten phase is as follows. A stock of material of nominal composition $Nb(Al_yGe_{(1-y)})_3$ having body-centered tetragonal ($NbAl_3$-type) structure is prepared by arc melting and then ground to a fine powder (—140 mesh). Any oxide impurity present in the aluminum starting material separates out as crystalline $Al_2O_3$ and is removed from the arc-melted button before it is ground. A desired composition $Nb_xAl_yGe_{(1-y)}$ is prepared by weighing proper amounts of powdered $Nb(Al_yGe_{(1-y)})_3$ and finely divided niobium metal, mixing the powders thoroughly, pressing in a steel die at approximately 50,000 p.s.i. and then heating in an eddy-current concentrator at 1550° C. for 30 minutes under a helium atmosphere. Lattice parameters and transition temperatures after annealing for eleven representative compositions prepared by this method are given in Table III. These materials were annealed at 740° C. for 100 hours and at 650° C. for an additional 60 hours. The super-conducting transition temperatures for the various samples after preparation at 1550° C. ranged between 18.4° and 18.6° K. The transition temperatures given in Table III are for the compositions after the final anneal at 650° C. These values are identical to those measured after the first anneal at 740° C., but the superconducting transition is much sharper after the 650° C. anneal, i.e., the temperature span over which the transition occurs is much smaller.

Still another mode of preparation of these compositions consists of premixing the elemental powders, pressing into a plug, heating the plug to 1450° to 1800° C. for one hour, cooling, and then annealing. A problem in using powdered elemental aluminum, however, is the inherent difficulty in avoiding oxygen contamination of the compositions being prepared.

TABLE III.—LATTICE PARAMETERS AND TRANSITION TEMPERATURES OF VARIOUS $Nb_xAl_{0.8}Ge_{0.2}$ COMPOSITIONS AFTER ANNEALING

| Sample | Nominal composition | $T_c$ (°K.) | Lattice parameters | | Beta-tungsten $a_0$ |
|---|---|---|---|---|---|
| | | | Sigma phase | | |
| | | | $a_0$ | $c_0$ | |
| 1 | $Nb_{2.0}Al_{0.8}Ge_{0.2}$ | 19.8 | 9.931±1 | 5.173±1 | 5.174±2 |
| 2 | $Nb_{2.1}Al_{0.8}Ge_{0.2}$ | 19.7 | 9.931±1 | 5.173±1 | 5.173±1 |
| 3 | $Nb_{2.2}Al_{0.8}Ge_{0.2}$ | 19.5 | 9.930±1 | 5.172±1 | 5.174±1 |
| 4 | $Nb_{2.3}Al_{0.8}Ge_{0.2}$ | 19.5 | 9.929±1 | 5.173±1 | 5.174±1 |
| 5 | $Nb_{2.4}Al_{0.8}Ge_{0.2}$ | 19.7 | 9.929±1 | 5.170±2 | 5.174±1 |
| 6 | $Nb_{2.5}Al_{0.8}Ge_{0.2}$ | 19.4 | 9.931±1 | 5.169±2 | 5.176±1 |
| 7 | $Nb_{2.6}Al_{0.8}Ge_{0.2}$ | 19.8 | (¹) | | 5.1725±2 |
| 8 | $Nb_{2.7}Al_{0.8}Ge_{0.2}$ | 19.6 | (¹) | | 5.1743±1 |
| 9 | $Nb_{2.8}Al_{0.8}Ge_{0.2}$ | 19.5 | (¹) | | 5.1757±2 |
| 10 | $Nb_{2.9}Al_{0.8}Ge_{0.2}$ | 19.5 | (¹) | | 5.1765±2 |
| 11 | $Nb_{3.0}Al_{0.8}Ge_{0.2}$ | 19.4 | (¹) | | 5.1767±1 |

¹ Concentration of sigma phase too low to permit lattice parameter determination.

Whenever these compositions are prepared by heat treating cold-pressed powdered constituents, it may be desirable to repeat the process one or more times to ensure a perfect homogeneity of composition throughout the final material. That is, after cooling, the plug is ground to powder again, the powder thoroughly mixed and re-pressed into a plug and again heat treated as before. When the plug is determined to be of suitable homogeneity the annealing schedule may be commenced by lowering the temperature to within the 700°–800° C. range and holding preferably for at least 50 hours and more optimally for approximately 100 hours. Alternatively, the material may be cooled to room temperature and the annealing schedule commenced at some later time by heating to 700°–800° C. for an appropriate length of time.

Critical limitations on the temperature range and time at temperature for the heat treatment of the pressed plug of powdered constituents have not been established. As indicated by the data of Table III a heat treatment schedule of 30 minutes at 1550° C. is sufficient to form the desired compositions. This temperature is not a critical one, however, and a material having the composition $Nb_{1.95}Al_{0.81}Ge_{0.19}$ has been prepared from pressed elemental powders by heating the pressed plug for 1 hour at 1450° C. This material has a transition temperature of 18.3° K. before annealing and 19.6° K. after annealing for 100 hours at 750° C. It is apparent that the limiting lower temperature for the heat treatment is some value below 1450° C. The upper temperature useful for this heat treatment is thought to be about 1800° C. because the sigma phase forms peritectically between 1800° and 1900° C. The pressure used to form the plug of compacted powders is not critical except insofar as it serves to bring the powders into intimate contact.

It can readily be seen from Table III that the lattice parameters of the sigma phase and beta-tungsten phase of the compositions disclosed therein remain fairly constant over the entire series, with the concentration of the beta-tungsten phase increasing as the niobium concentration is increased. This is reasonably to be expected. However, when the compositions are ground to —200 mesh powders and superconducting measurements made on the powdered materials a totally unexpected result is obtained. None of the compositions show the strong degradation in the superconducting transition versus temperature curve normally observed for the arc-melt preparation of materials consisting substantially of the beta-tungsten phase. Yet on the basis of the prior art it would reasonably have been expected that Samples 9, 10, and 11 of Table III, consisting substantially of the beta-tungsten phase, should show degradation in the superconducting transition similar to that given in FIG. 3 for an arc-melted material of composition $Nb_3Al_{0.8}Ge_{0.2}$. All the compositions given in Table III showed very little degradation when powdered with the bulk of the material remaining superconducting over the entire temperature range measured, that is, 4.0° K. to the transition temperature.

X-ray diffraction analyses reveal that it is exceedingly difficult to prepare an arc-melted single-phase material consisting solely of the beta-tungsten phase or the sigma phase. Through choice of a proper ratio of elemental constituents one phase or the other can be made to predominate, but the second one remains present to some degree. Annealing may serve to reduce the amount of the undesired phase but it normally does not remove it completely. Thus, for example, Arrhenius et al. in attempting to maximize the amount of beta-tungsten phase present in a material having the nominal composition $Nb_{12}Al_3Ge$ report that even after an anneal at 850°–750° C. for 214 hours, vestigial amounts of the sigma phase, i.e., $Nb_2(Al,Ge)$, are still present. This is also the case with the niobium-deficient, i.e., the $Nb_2(Al,Ge)$, materials. Arc-melted samples of these materials even after long anneals, tend to contain small amounts of the beta-tungsten phase, i.e., Nb$_3$(Al,Ge). This, of course, complicates attempts to ascertain what phase is responsible for the high transition temperatures found to be exhibited by certain materials in the Nb$_2$(Al,Ge) system.

Although it is well known in the art that annealing is necessary for the achievement of high transition temperatures, the role that it plays is not completely understood. It appears that annealing serves to increase the ordering in the system, and it may also serve to minimize the amount of undesired phases present, as mentioned above. The annealing schedule will vary according to the system; but those materials heretofore known to display the highest transition temperatures, that is, those in the beta-tungsten Nb$_3$(Al,Ge) system, have generally required long annealing at moderate temperatures to achieve the maximum transition temperatures. Annealing schedules which will maximize the transition temperatures of materials in the sigma-phase Nb$_2$(Al,Ge) system have not been determined; however, generally speaking the annealing schedule preferred for these materials is at least 50 hours at about 750° C. Shorter annealing times will increase the transition temperatures somewhat over those of the unannealed materials but not as substantially as the longer annealing times. Anneals for times of 100 hours or longer are known, however, to produce the greatest increases in transition temperature.

Critical temperatures for the various compositions were determined in the following manner. A stable 17-cycle alternating current is applied to the primary of a sensing coil. The output from two multithousand turn secondary coils (connected in opposition) is fed to the input of a Lock-In type of amplifier. The output from the amplifier is applied to the y-axis of an x–y recorder. The sample is placed within and affects only one of the secondary coils. Any slight change in the magnetic permeability of the sample causes an imbalance in the secondary circuit and results in a direct current signal at the output of the amplifier. This signal is proportional to the permeability change and thus gives a semiquantitative value of it. Temperature is plotted along the x-axis of the recorder as a varing D.C. signal corresponding to changes in the resistance of a calibrated temperature sensing resistor in a liquid helium cryostat. (A motor driven voltage divider provides a continuously varying power input to the heater in the cryostat, resulting in a smooth temperature rise of the sample from 4° K. to approximately 25° K. over a four-minute interval.) This results in a magnetic susceptibility versus temperature plot for the sample and detects all superconducting phases present in the temperature range under study. Simple switching permits more precise measurement of the transition temperatures through the use of a Wheatstone bridge.

Transition temperatures of all compositions were also measured by this technique in liquid hydrogen with the temperature of the sample being varied by changing the vapor presure above the liquid hydrogen. Transition temperatures determined with liquid hydrogen cooling were in excellent agreement with those measured using the calibrated temperature sensing resistor.

It will be apparent to one of reasonable skill in the art that what has been disclosed are annealed superconducting materals having the nominal composition Nb$_x$Al$_y$Ge$_{(1-y)}$, where $x$ is in the range of 1.9 to 2.8 and $y$ is in the range of 0.5 to 0.9, comprising multiphase mixtures consisting substantially of sigma phase, substantially beta-tungsten phase, or substantially of these two phases which have transition temperatures of 19° K. or higher. Further, it will be apparent that irrespective of the method of preparation annealed materials in the Nb$_2$(Al,Ge) system having the preferred nominal composition of Nb$_2$Al$_y$Ge$_{(1-y)}$ where $y$ is in the range of 0.5 to 0.9 undergo minimal degradation in transition temperature on being ground to fine powder. Finally, it will be understood that annealed materials in the Nb$_3$(Al,Ge) system prepared by heat treating a pressed plug of powdered constituents according to the methods disclosed herein will also undergo minimal degradation in transition temperature on being ground to fine powder.

What we claim is:

1. Superconducting materials having transition temperatures of at least 19° K. of the general composition Nb$_x$Al$_y$Ge$_{(1-y)}$, where $x$ is in the range of 1.9 to 2.8 and $y$ is in the range of 0.5 to 0.9, said material being a multiphase mixture substantially consisting of the tetragonal sigma and the beta-tungsten phases.

2. The materials of claim 1 wherein $x$ is 2.0

3. The materials of claim 1 wherein $x$ is in the range of 1.9 to 2.8 and $y$ is 0.80.

References Cited

UNITED STATES PATENTS

| | | | |
|---|---|---|---|
| 3,215,569 | 11/1965 | Kneip et al. | 148—133 |
| 3,506,940 | 4/1970 | Corenwit et al. | 148—32 X |

OTHER REFERENCES

Science, May 1967, pp. 645–646.

Metallurgy of Advanced Electronic Materials, AIMME, Metallurgy Society Conf., vol. 19, 1962, p. 83.

CHARLES N. LOVELL, Primary Examiner

U.S. Cl. X.R.

75—174; 335—216